United States Patent [19]

Bauer et al.

[11] 4,289,732

[45] Sep. 15, 1981

[54] APPARATUS FOR INTIMATELY ADMIXING TWO CHEMICALLY REACTIVE LIQUID COMPONENTS

[75] Inventors: John R. Bauer, Baytown; Robert W. Byars, LaPorte; Robin L. Grieve, Houston, all of Tex.

[73] Assignee: The Upjohn Company, Kalamazoo, Mich.

[21] Appl. No.: 123,797

[22] Filed: Feb. 22, 1980

Related U.S. Application Data

[62] Division of Ser. No. 969,221, Dec. 13, 1978, abandoned.

[51] Int. Cl.³ ............................................. B01F 5/20
[52] U.S. Cl. ................................. 422/224; 239/543; 239/545; 260/453 PH; 366/173
[58] Field of Search ............... 422/224; 239/543, 545; 260/453 PH; 366/167, 173

[56] References Cited

U.S. PATENT DOCUMENTS

| | | | |
|---|---|---|---|
| 2,719,584 | 10/1955 | Winslow | 239/545 X |
| 3,188,337 | 6/1965 | Gemassmer | 260/453 PH |
| 3,345,134 | 10/1967 | Heymer et al. | 422/224 X |
| 3,507,626 | 4/1970 | Van Horn | 422/224 |
| 3,540,853 | 11/1970 | Kulling et al. | 422/224 X |
| 3,781,320 | 12/1973 | Irwin | 260/453 PH |
| 3,942,723 | 3/1976 | Langdon | 239/543 X |
| 3,947,484 | 3/1976 | Mitrowsky et al. | 260/453 PH |
| 4,059,415 | 11/1977 | Kosaka et al. | 422/224 X |
| 4,188,368 | 2/1980 | Frosch et al. | 422/224 X |

FOREIGN PATENT DOCUMENTS

| | | | |
|---|---|---|---|
| 335865 | 2/1904 | France | 239/545 |
| 1238669 | 7/1971 | United Kingdom | 422/224 |

*Primary Examiner*—Richard L. Chiesa
*Attorney, Agent, or Firm*—Denis A. Firth; John Kekich

[57] ABSTRACT

An apparatus is described for intimately admixing two liquid components which react chemically with each other immediately after mixing (the mixing of phosgene and polyamines is an example). The mixing is accomplished by introducing one component in the form of a fan shaped spray into a mixing chamber, and causing this spray to intersect with twin fan-shaped sprays of the second component which latter sprays are introduced into the mixing chamber from preferably diametrically opposed locations in a direction substantially perpendicular to the direction of the first component spray. The process and apparatus in question provide improved mixing, substantially reduce problems of solids deposition hitherto encountered in similar processes, and give products of greater uniformity and improved physical properties.

5 Claims, 7 Drawing Figures

APPARATUS FOR INTIMATELY ADMIXING TWO CHEMICALLY REACTIVE LIQUID COMPONENTS

This is a division of application Ser. No. 969,221 filed Dec. 13, 1978, now abandoned.

BACKGROUND OF THE DISCLOSURE

1. Field of the Invention

This invention relates to admixing liquid components and to apparatus for carrying out the admixing and is more particularly concerned with an improved apparatus for mixing liquid components which enter into rapid chemical reaction immediately upon admixture.

2. Description of the Prior Art

Certain chemical reactions which are routinely carried out on a commercial scale pose a very serious problem because of the speed with which the reaction takes place after the reactants are brought together. The efficiency of mixing of such reactants is of critical importance in carrying out the desired reaction. Thus, if the mixture of reactants is not homogeneous when the reaction commences there will be variation, from site to site within the reaction mixture, of the relative molar proportions of the reactants. Such variation can lead to the formation of different products at the different sites.

The reaction between phosgene and polyamines to form polyisocyanates and the reaction between aniline and formaldehyde, usually in the presence of hydrochloric acid, to form methylene-bridged polyphenyl polyamines, are two such reactions. In both of these reactions the initiation of reaction after admixture of the reactants is almost instantaneous. Further, inefficient admixture of the reactants can give rise in both cases to the formation of solid by-products which tend to separate as they are formed. Such deposition can, in certain circumstances, lead to clogging of apparatus and eventually to shutdown of the reaction process.

Much attention has been paid in the prior art to the particular problem of seeking to minimize the effects of solid deposition in carrying out the above types of reaction. Thus, the use has been reported of a rotary mixer with high shear mix zone (U.S. Pat. No. 3,781,320), of a high speed mixer (U.S. Pat. No. 3,188,337), and of a multi-stage rotary pump (U.S. Pat. No. 3,947,484). The latter reference gives a lengthy analysis of the various prior art methods which have been utilized for this type of reaction and the analysis in question is hereby incorporated in this disclosure by reference.

One of the most successful devices hitherto employed in the art for carrying out the above reactions is that described in U.S. Pat. No. 3,507,626 and the improvement thereof which is described in British Pat. No. 1,238,669. In the latter reference a device is described by means of which the two streams of reactants are caused to follow initially parallel annular paths one of which ultimately flares outwardly and is united with the other, the mixed fluids being carried rapidly downstream from the point of mixing so that backmixing and deposition of by-product solids at the site of mixing are both minimized. It has been found, however, that even the use of this device gives rise eventually to the buildup of layers of solid on the walls of the mixing device adjacent the point of admixture of the two reactant streams. This leads to channeling of product in the mixing device and ultimately requires that the device be taken out of service for cleaning and repairs.

We have now found that the problems hitherto encountered in the art in the efficient admixing of highly reactive components can be minimized or eliminated using the novel apparatus and process which are described hereinafter. Further, we have found that the increased efficiency of mixing of the reactants which is achieved by the process and apparatus herein described, results in production of end product of improved properties not all of which appear to be attributable solely to the more efficient mixing of the starting reactants.

SUMMARY OF THE INVENTION

This invention comprises a method for intimately mixing first and second liquid components which enter into reaction one with another substantially immediately after they are brought together which method comprises:

introducing said first liquid component under pressure in the form of a fan-shaped spray into a substantially cylindrically shaped mixing chamber in a direction substantially along the longitudinal axis of said mixing chamber;

simultaneously introducing said second liquid component under pressure into the path of said first liquid component in said mixing chamber, in a direction substantially perpendicular to the direction of the spray of said first component, in the form of at least two fan-shaped sprays; and conducting the resulting mixture of said two liquid components from said mixing chamber to a subsequent reaction zone.

The invention comprises apparatus adapted to carry out the above process which apparatus comprises in combination:

a substantially cylindrically shaped mixing chamber provided with exit means at one end thereof and a plurality of inlet means at the other end thereof;

a first jet inlet means disposed substantially symmetrically in the end of the said mixing chamber remote from said exit means and having the nozzle of said jet means directed substantially along the longitudinal axis of said mixing chamber;

at least two additional jet inlet means disposed in the side walls of said mixing chamber at the end thereof remote from said exit means, the nozzles of said jets being directed towards the longitudinal axis of said mixing chamber and in a plane at right angles to said axis;

means for introducing a first liquid component under pressure through said first jet inlet means;

means for introducing a second liquid component under pressure simultaneously through each of said additional jet inlet means; and means for conducting mixed liquid components from said exit port to a subsequent reaction zone.

DETAILED DESCRIPTION OF THE INVENTION

Figure 1:
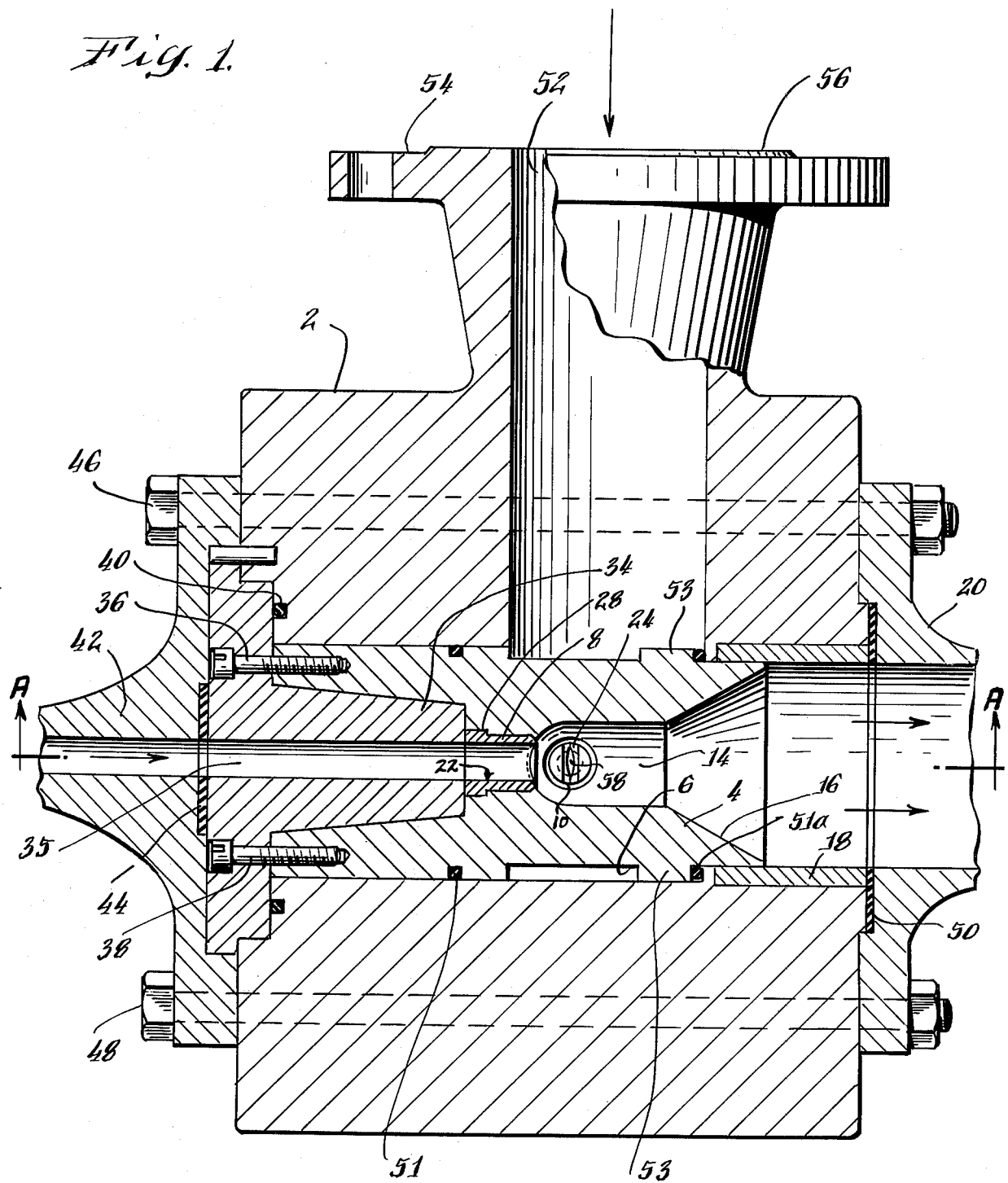
FIG. 1 is a pictorial representation, partly in cross-section, of a side elevation of one embodiment of an apparatus for intermingling highly reactive components in accordance with the invention.
Figure 2:
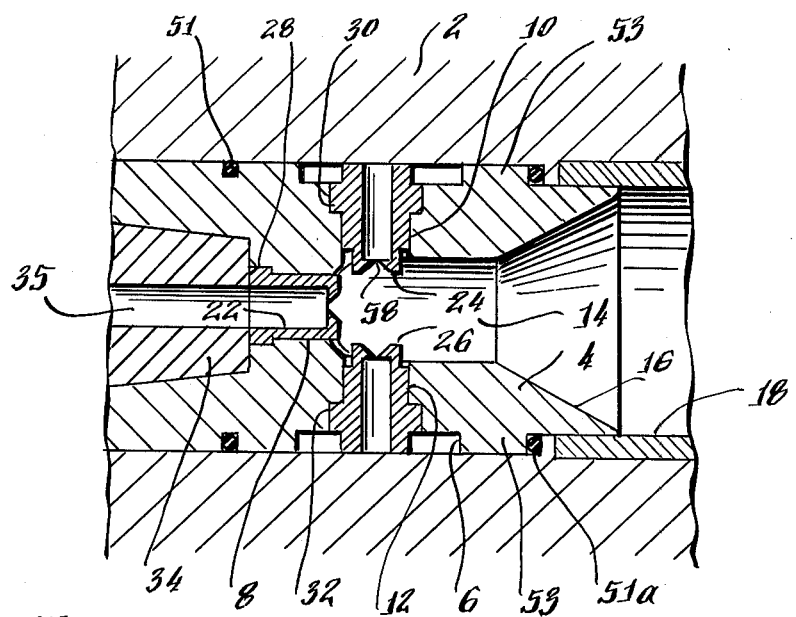
FIG. 2 is a cross-sectional view taken along the line A—A of the apparatus shown in FIG. 1.

Reference is made to FIG. 1 wherein there is shown a side elevation, partly in cross-section, of one embodiment of an apparatus in accordance with the invention and to FIG. 2 wherein there is shown a partial cross-sectional view taken along line A—A of FIG. 1. The embodiment shown in FIGS. 1 and 2 is composed basically of a hollow T-shaped housing (2) having a hollow spool (4) disposed in the crossbar section of the housing (2). The spool (4) is provided with an annular passage (6) and with cylindrical channels (8), (10) and (12) each of which communicates with a mixing chamber (14) formed by the inner walls of the spool (4). The mixing chamber (14) has a bell-shaped opening which leads to an exit pipe (20) via lined passageway (18), said lining being of material such as tungsten carbide which will withstand abrasion, corrosion and like forces to which it might be subjected by the particular reaction mixture caused to pass therethrough.

Each of the channels (8), (10) and (12) is adapted to receive a fan jet spray nozzle shown respectively as (22), (24) and (26), the nozzle tips of which project into the mixing chamber (14). The precise extent to which said nozzle tips project into the mixing chamber (14) is limited by the provision of flanges (28), (30) and (32) on the outer ends of the barrels of nozzles (22), (24) and (26) respectively, which flanges engage with corresponding grooves provided in the outer ends of the respective channels (8), (10) and (12). The fan jet spray nozzle (22) and the channel (8) within which it is located are aligned with their longitudinal axes disposed co-axially with the longitudinal axis of the spool (4). The longitudinal axes of the fan jet spray nozzles (24) and (26), and the respective channels (10) and (12) in which they are housed, are aligned along a common axis which is substantially perpendicular to the longitudinal axis of the spool (4).

Each of said spray jet nozzles (22), (24) and (26) is in sliding engagement with its respective housing channels (8), (10) and (12). The nozzles (24) and (26) are held in place by contact between their outer ends and the inner wall of the housing (2). The nozzle (22) is held in place by a flange tip (34) having cylindrical passageway (35) which, in turn, is held in place in sealing engagement with the end of the crossbar section of housing (2) by means of set screws (36) and (38) and O-ring (40). The spool (4) is also thereby secured in place in fluid tight engagement with the interior of housing (2) by means of O-rings (51) and (51a), and by the contact of flange (53) with the corresponding flange on the interior of housing (2). Additional means for locking the nozzles (22), (24) and (25) in place can be provided in the form of locking clips (not shown) and the like, if desired.

The interior of feed pipe (42) communicates with passageway (35) in spool (34) and permits one of the two fluid components which are to be mixed to be fed to fan jet spray nozzle (22). The second of the two liquid components is fed through inlet port (52) via a feed pipe (not shown) which can be attached in sealing engagement at said inlet port using flange (54) and gasket surface (56). Fluid fed through inlet port (52) passes to annular passage (6) and thence to fan jet spray nozzles (24) and (26).

Figure 3A:
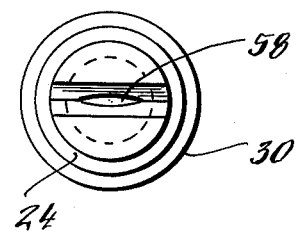
FIG. 3A is a plan view of the top of the jet nozzle shown in FIG. 3.
Figure 3B:
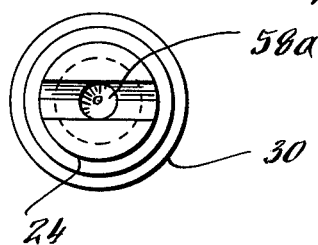
FIG. 3B is a plan view of an alternative embodiment of a top of a jet nozzle for use in the apparatus and method of the invention.
Figure 3:
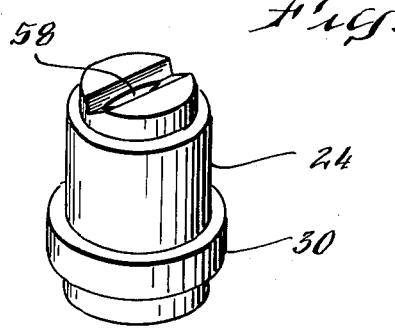
FIG. 3 is a perspective view of a jet nozzle employed in the embodiment of an apparatus according to the invention.

FIG. 3 is a perspective drawing illustrating the configuration of a typical fan jet spray nozzle which can be employed in the embodiments shown in FIGS. 1 and 2. The nozzle mouth (58) shown in the jet nozzle in FIG. 3 is elliptical in cross-section as can be seen more readily in FIG. 3A which is a plan view of the top of the jet nozzle shown in FIG. 3. While this is the preferred configuration for use in the process and apparatus of the invention, it is also possible to use other configurations. Illustratively, the nozzle mouth of the jet nozzle can be circular in cross-section and frusto-conical in overall configuration with the base of the frustum uppermost as illustrated in the plan view of the top of the jet nozzle shown in FIG. 3B.

The three fan jet spray nozzles (22), (24), and (26) can be identical in all respects or, in a preferred embodiment discussed further below, the fan jet spray nozzle (22) is one which produces a smaller spray pattern arc than the other two nozzles which latter are preferably identical, i.e. produce identical spray patterns.

In carrying out the admixing of two highly reactive fluid components using the illustrative apparatus described above with reference to FIGS. 1, 2 and 3, a first liquid component is fed under pressure via feed pipe (42) and channel (35) to the fan jet spray nozzle (22). Advantageously, the pressure used is of the order of 150 psi to 700 psi although the exact pressure employed in any given instance is not critical. The second fluid component necessary for the reaction is fed under pressure, advantageously substantially equal to the pressure employed for the first component, via feed inlet (52) and annular passageway (6) to each of fan jet spray nozzles (24) and (26).

The two streams of said second component issuing from said nozzles (24) and (26) into mixing chamber (14) are preferably identical in shape and symmetrically disposed one towards the other so that the two streams intersect in a plane coincident with the longitudinal axis of the mixing chamber (14). The stream of said first fluid component issuing from fan jet spray nozzle (22) into mixing chamber (14) intersects with the two opposing streams of the second fluid component thereby effecting highly efficient mixing of the two components under conditions of high turbulence.

The precise position of the individual fan jet spray nozzles and the design of the jets therein, the size and configuration of the mixing chamber (14) and the spray patterns produced by the various nozzles, are all factors which influence the efficiency of the mixing of the two fluid components. The exact combination of these factors which will give the most favorable results for the mixing of a given pair of fluid component: is something which can be determined by a process of trial and error.

In general, it is found preferable to employ fan jet spray nozzles which produce a so-called "flat" spray, i.e. a spray which is elliptical in cross-section, such as illustrated in FIGS. 3 and 3A, and most preferably one in which the elliptical cross-section has a longitudinal axis which is at least 1.5 times the shortest axis. Further, it is found highly advantageous to select fan jet spray nozzles with the appropriate jets to produce flat sprays and to orient them in such a manner as to produce an intersecting spray pattern such as that shown, in highly idealized fashion, in the perspective drawing shown in FIG. 4. In this embodiment the flat spray patterns issuing from fan jet spray nozzles (24) and (26) are symmetrically disposed and have an elliptical cross-section whose longitudinal axis, represented by the common axis X—X at the plane of the intersection of the two streams, is perpendicular to the direction in which the spray of the other component is issuing from the fan jet spray nozzle (22). Further, the latter is a flat spray pattern having an elliptical cross-section whose longitudinal axis, represented by Y—Y at the point at which this spray pattern intersects with the sprays from nozzles (24) and (26), is perpendicular to the direction of the latter two sprays. Finally, the configuration and location of fan jet spray nozzle (22), relative to the configuration and location of the other two nozzles, is so chosen that the width of the spray pattern of the spray issuing from nozzle (22) is significantly less than the width of the spray pattern from the other two nozzles at the point at which the two patterns intersect.

Figure 4:
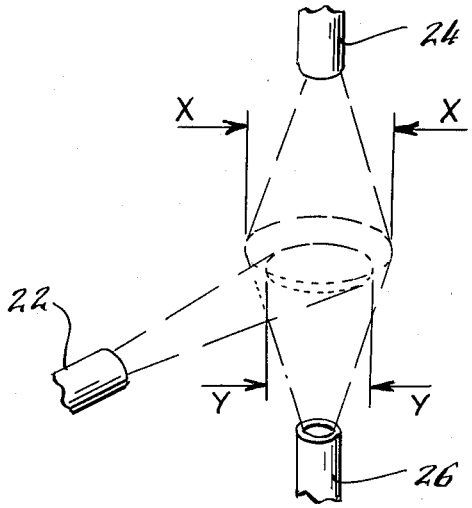
FIG. 4 is a pictorial representation of one embodiment of the manner in which sprays of liquid components are brought together in accordance with the invention.
Figure 5:
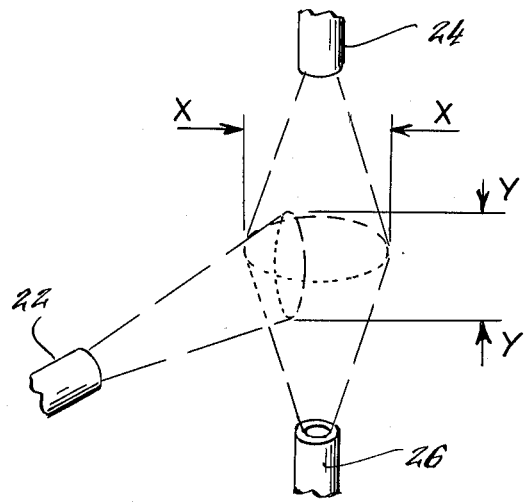
FIG. 5 is a pictorial representation of another embodiment of the manner in which sprays of liquid components are brought together in accordance with the invention.

FIG. 5 illustrates another type of spray pattern which can be employed in which the flat spray pattern issuing from fan jet spray nozzle (22) has been rotated through an angle of substantially 90° from that shown in the embodiment of FIG. 4 so that the longitudinal axis Y—Y of the elliptical cross-section of said spray pattern at the point of intersection with the other two sprays is aligned in the same direction as the latter sprays. In both of the embodiments shown in FIGS. 4 and 5 the spray patterns illustrated serve to ensure that the fluid reactant component issuing as the spray from nozzle (22) is completely surrounded and enveloped by the second fluid reactant issuing from spray nozzles (24) and (26).

As will be obvious to one skilled in the art, the particular combination of spray patterns shown in FIGS. 4 and 5 can be achieved in a number of ways. Illustratively, one can use identical nozzles, all designed to give the same elliptical spray pattern, in each of the three positions but locating the nozzle (22) in a position such that the distance through which the spray from said nozzle has to travel before it intersects with the spray from the other two nozzles (24) and (26) is less than half the distance between the latter two nozzles. Alternatively, the three nozzles can be located substantially symmetrically in the mixing chamber (14) so that the distance which the spray from each nozzle has to travel before reaching the point of intersection is substantially the same in all cases. However, in order to achieve the desired result in these circumstances, the fan jet spray nozzle (22) is so chosen that the maximum angle described by the fan spray pattern issuing therefrom is significantly less than that described by the fan spray patterns issuing from nozzles (24) and (26). Illustratively, in such an embodiment the fan jet spray nozzle (22) is so chosen that it produces a fan spray pattern which describes an angle of about 45° while the fan spray pattern issuing from nozzles (24) and (26) describes a maximum angle of about 90°.

While the above discussion and the various embodiments illustrated in FIGS. 1, 2, 4 and 5 have been limited to the use of only two fan jet spray nozzles (24) and (26) to introduce the second liquid component, it will be obvious that three or more such nozzles could also be used, the only requirement being that each such nozzle is disposed so that the spray therefrom is projected in a direction towards the central axis of the mixing chamber (14) and at right angles to the direction of spray from the nozzle (22).

The bringing together of the two fluid components, using any of the various embodiments described above, results in highly efficient mixing with very turbulent conditions in the mixing chamber (14). In the particular embodiments shown in FIGS. 1 and 2 above the closed end of the mixing chamber (14), i.e. the end which houses the three nozzles (22), (24) and (26), is shown as being hemispherical in configuration. This is a very convenient configuration insofar as it ensures that there are no "dead" spots in this location which might lead to build up of deposited solids, etc. However, this particular configuration is not critical to success and other configurations of this area of the mixing chamber can be employed without detracting from the overall excellent mixing achieved by the process of the invention.

The overall length of the mixing chamber (14) and diameter thereof are not critical to success of the method of the invention and the most appropriate dimensions to be employed for achieving optimum mixing of any particular combination of reactants can readily be determined by a process of trial and error.

The fluid mixture resulting from the bringing together of the two liquid components in the above manner passes in a continuous manner under pressure from the mixing chamber (14) via the exit pipe (20) to a further reaction zone (not shown) wherein the mixture is subjected to further treatment in accordance with procedures conventional in the art for whatever particular reaction is being carried out. The exit (16) from the mixing chamber (14) is shown, in the particular embodiments illustrated in FIGS. 1 and 2, as having a flared bell-like configuration. This is not a critical feature of the mixing process and apparatus of the invention but is merely a convenient manner of accomplishing a smooth passage of mixed reactants from the mixing chamber (14) to the exit pipe (20) which, in the particular embodiment shown, has a greater internal diameter than the mixing chamber itself. The particular configuration shown for exit section (16) ensures that there are no restrictions, pockets and the like which can lead to buildup of deposits or create "dead" spots, i.e. accumulations of mixed reactants which are bypassed by the main stream of mixed reactants.

Similarly the use of the special liner (18), which is shown in the particular embodiments illustrated in FIGS. 1 and 2, is an optional feature intended to ensure longer life of the apparatus, i.e. to protect against corrosion and abrasive forces and the like, and is not a critical feature of the method and apparatus of the invention.

The method of the invention can be applied to achieve mixing of any of a wide variety of reactants which are known to undergo rapid reaction immediately after they are brought together and which, therefore, require highly efficient and rapid mixing in order to ensure a homogeneous reaction mixture and, hence, a homogeneous reaction product. Illustrative of such reactions are that which involve the reaction between polyamines and phosgene (both components being employed as solutions in an inert solvent such as chlorobenzene) to produce the corresponding isocyanates and the reaction between aniline (as an aqueous solution containing hydrochloric acid) and aqueous formaldehyde to produce a mixture of methylene-bridged polyphenyl polyamines. Both of these reactions are well-recognized in the art as capable of producing unwanted by-products some of which are solid in nature. The formation of these solid by-products has caused considerable problems in carrying out the reactions in question because of rapid buildup of deposits of the solids in the apparatus hitherto employed to bring the reactants together. In many instances the buildup of solids occurs so rapidly that it is necessary to shut down the process to effect cleaning of the apparatus at frequent intervals. Such requirements are clearly highly undesirable particularly in processes which are required to be run on a continuous basis.

The use of the method and apparatus of this invention has been found to obviate the difficulties hitherto involved in reactions of the above type and has enabled the reactions in question to be carried out continuously over prolonged periods with no significant buildup of solid deposits. Further, it is found that the reaction products achieved by use of the method and apparatus of the invention are characterized by a markedly improved uniformity of composition and a markedly lower proportion of undesirable by-products than products produced in accordance with prior procedures.

The process of reacting polyamines with phosgene to produce polyisocyanates and the process of reacting aniline with formaldehyde (generally in the presence of aqueous hydrochloric acid incorporated in the aniline stream) to produce methylene bridged polyphenyl polyamines are both characterized by the fact that one reactant, namely phosgene in the first case and aniline in the second case, is generally present in excess of the stoichiometric amount required for the reaction. In all such cases the reactant which is to be employed in excess is the reactant which is fed to the two nozzles (24) and (26) in the embodiments shown in FIGS. 1 and 2 and the other reactant is the one fed to the nozzle (22).

It is to be understood that, while the method and apparatus of the invention have been described above by reference to certain particular embodiments thereof, it is to be clearly understood that these embodiments have been given for purposes of illustration only and are not intended to be limiting. The scope of the invention is bounded only by the scope of the claims which are set out hereafter.

We claim:

1. An apparatus adapted to achieve intimate mixing of two liquid components which enter into reaction one with the other substantially immediately after they are brought together, which apparatus comprises in combination:

a substantially cylindrically shaped mixing chamber provided with side walls, and exit means at one end thereof and a plurality of inlet means at the other end thereof;

a first jet inlet means disposed substantially symmetrically in the end of the said mixing chamber remote from said exit means and having the nozzle of said jet means projecting into said mixing chamber and being directed substantially along the longitudinal axis thereof;

at least two additional jet inlet means disposed in the side walls of said mixing chamber at the end thereof remote from said exit means, the nozzles of said jets projecting through the side walls into said mixing chamber and being directed towards the longitudinal axis of said mixing chamber and in a plane substantially at right angles to said axis;

means for introducing a first liquid component under pressure through said first jet inlet means;

means for introducing a second liquid component under pressure simultaneously through each of said additional jet inlet means; and means for conducting mixed liquid components from said exit means to a subsequent reaction zone; each of said first and said additional jet inlet means being provided with shaping means for forming said liquid components into flat spray patterns; said first jet inlet means and said additional jet inlet means being so arranged relative to each other that the paths of all of said flat sprays formed from said liquid components intersect at a common locus.

2. Apparatus according to claim 1 wherein said exit means is frusto-conical in configuration.

3. Apparatus according to claim 1 wherein said additional jet inlet means comprise two jet means disposed diametrically opposite each other in the side wall of said mixing chamber.

4. Apparatus according to claim 1 wherein each of said shaping means produces a spray of elliptical cross-section from liquid passing therethrough under pressure.

5. An apparatus in accordance with claim 1 wherein the interior of the portion of the mixing chamber which houses said first and said additional jet inlet means is hemispherical in configuration.

* * * * *

UNITED STATES PATENT OFFICE
CERTIFICATE OF CORRECTION

Patent No. 4,289,732      Dated September 15, 1981

Inventor(s) John R. Bauer, Robert W. Byars and Robin L. Grieve

It is certified that error appears in the above-identified patent and that said Letters Patent are hereby corrected as shown below:

Column 3, line 65 "(25)" should read --(26)--.

Column 4, line 60 "component:" should read --components--.

Signed and Sealed this

Fifth Day of January 1982

[SEAL]

Attest:

GERALD J. MOSSINGHOFF

Attesting Officer      Commissioner of Patents and Trademarks